United States Patent [19]

Godwin et al.

[11] Patent Number: 4,935,835

[45] Date of Patent: Jun. 19, 1990

[54] MAGNETIC MEDIA CONTAINING REFERENCE FEATURE AND METHODS FOR REFERENCING MAGNETIC HEAD POSITION TO THE REFERENCE FEATURE

[75] Inventors: Jimmy D. Godwin, San Jose; Roger O. Williams, Fremont; Stephen P. Williams, San Jose; Alton B. Otis, Jr., San Francisco, all of Calif.

[73] Assignee: Insite Peripherals, Inc., San Jose, Calif.

[21] Appl. No.: 269,779

[22] Filed: Nov. 10, 1988

[51] Int. Cl.$^5$ .......................... G11B 5/82; G11B 5/56
[52] U.S. Cl. .................. 360/135; 360/77.04; 360/77.07
[58] Field of Search ............. 360/77.04, 77.06, 77.07, 360/135; 369/14

[56] References Cited

U.S. PATENT DOCUMENTS

| | | | |
|---|---|---|---|
| Re. 23,602 | 12/1952 | Mann et al. | 360/135 X |
| 2,721,906 | 10/1955 | Sharpe | 360/135 X |
| 3,214,178 | 10/1965 | Waruke | 360/135 X |
| 3,373,997 | 3/1968 | Berndt et al. | 369/14 X |
| 3,593,331 | 7/1971 | Connell et al. | 360/135 |
| 3,753,252 | 8/1973 | Tietze | 360/135 |
| 3,772,081 | 11/1973 | Franer | 360/135 X |
| 4,136,365 | 1/1979 | Chick et al. | 360/77.11 X |
| 4,149,199 | 4/1979 | Chick et al. | 360/77.04 |
| 4,412,264 | 10/1983 | Imamura et al. | 369/14 X |
| 4,513,333 | 4/1985 | Young et al. | 360/135 X |
| 4,530,020 | 7/1985 | Sutton | 360/135 X |
| 4,556,597 | 12/1985 | Best et al. | 369/14 X |
| 4,587,579 | 5/1986 | Cocke et al. | 369/14 X |
| 4,633,451 | 12/1986 | Ahn et al. | 369/14 |
| 4,639,906 | 1/1987 | Goto | 369/14 |
| 4,734,810 | 3/1988 | Nakayama et al. | 360/135 X |
| 4,737,877 | 4/1988 | Krongello et al. | 360/135 |
| 4,802,050 | 1/1989 | Miyabayashi et al. | 360/135 |

FOREIGN PATENT DOCUMENTS 2131580 6/1984 United Kingdom .

OTHER PUBLICATIONS

IBM Technical Disclosure Bulletin, *Monolithic Optical Track Scanner for Magnetic Recording System*, Scranton, vol. 25, No. 12, May 1983, pp. 6432–6433.

IBM Technical Disclosure Bulletin, *Optical Recording of Serro Pattern on Magnetic Discs*, Aviram et al., vol. 27, No. 7A, Dec. 1984, pp. 3994–3995.

IBM Technical Disclosure Bulletin, *Track Following Servo for Magnetic Recording Using Luminescent Servo Tracks*, Kubec et al., vol. 12, No. 4, Sep. 1969, pp. 599–600.

IBM Technical Disclosure Bulletin, *Optical Servo Information on Magnetic Recording Disks*, J. Schneider, vol. 16, No. 4, Sep. 1973, p. 108.

IBM Technical Disclosure Bulletin, *Correction of Data Track Misregistration in Servo Controlled Disk Files*, A. Paton, vol. 17, No. 6, Nov. 1984, pp. 1781–1783.

(List continued on next page.)

*Primary Examiner*—Steven L. Stephan
*Assistant Examiner*—David L. Robertson
*Attorney, Agent, or Firm*—Thomas E. Schatzel

[57] ABSTRACT

A magnetic medium including a physical reference feature for conveying positional information to a magnetic read/write head. The reference feature is made by indelibly marking a pattern on a surface of the medium such as by inscribing the metal oxide coating on the medium surface or by chemical etching or photolithography of the surface. Magnetic data is written on the surface of the medium and when data written on the reference feature is read, a modulated read back signal is observed which indicates the position of the reference feature. The position of the reference feature is used to direct the read/write head to track zero or to some other position on the medium surface. By using a second magnetic read/write head to write data on a second surface of the medium in response to the modulated readback signal, an electronic reference track can be written on the second surface for providing positional information to the second magnetic read/write head.

21 Claims, 2 Drawing Sheets

OTHER PUBLICATIONS

IBM Technical Disclosure Bulletin, *Floppy Disc Embossing for Servo Applications*, Acosta et al., vol. 21, No. 10, Mar. 1979, pp. 4259–4260.

A. S. Hoagland, *Optical Servo of Magnetic Recording*, IBM Tech. Disc. Bulletin, vol. 20, No. 10, Mar. 1978, pp. 4108–4109.

D. A. Thompson et al., *Embossed Servo Techniques for Floppy Disks*, IERE Conference Proceedings, No. 43, Jul. 1979, pp. 321–327.

N. Koshino and S. Ogawa, *Optical Method of the Head Positioning in Magnetic Disk System*, IEEE Transactions on Magnetics, vol. Mag. 16, No. 5, Sep. 1980, pp. 631–633.

K. D. Broadbent, *A Review of the MCA Disco-Vision System*, Journal of the SMPTE, vol. 84, pp. 554+.

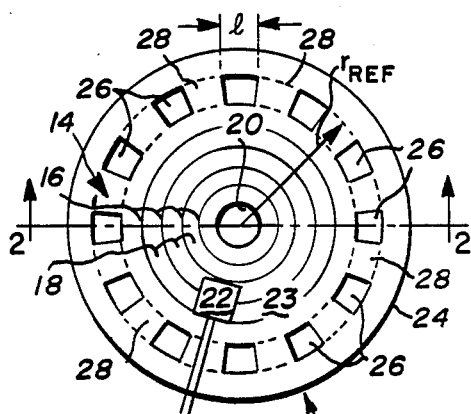
Fig_1
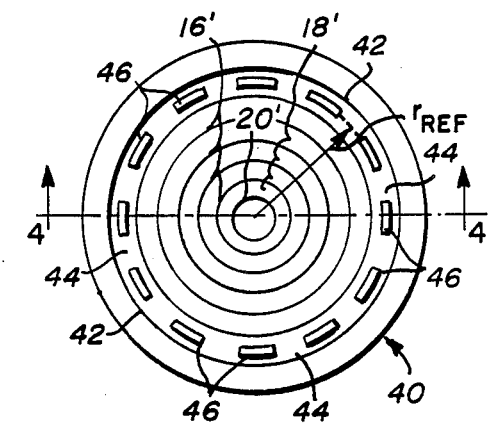
Fig_3
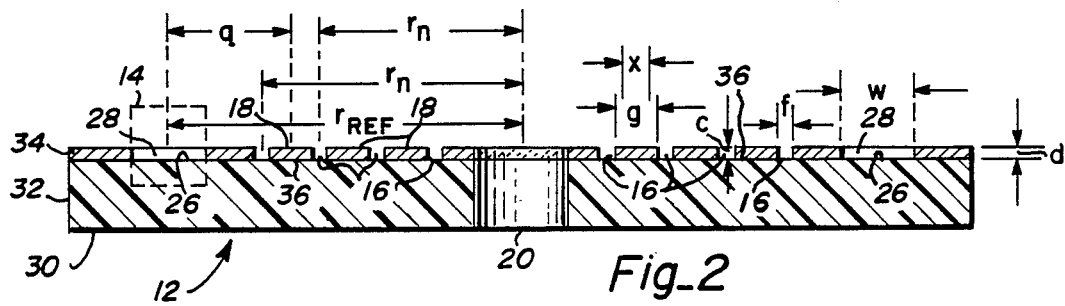
Fig_2
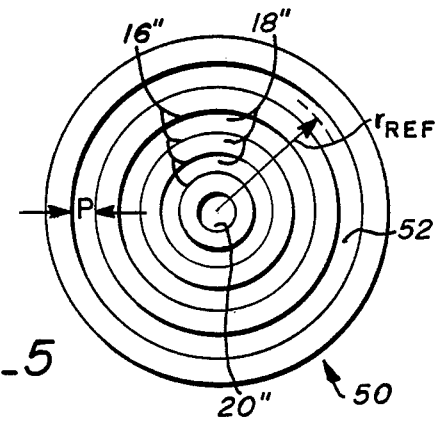
Fig_5
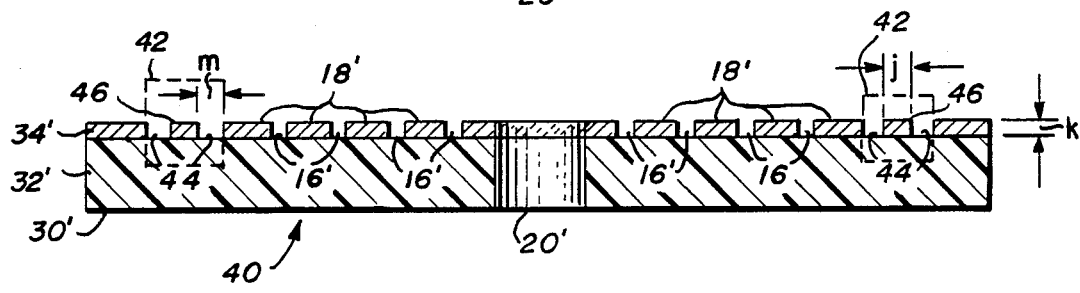
Fig_4

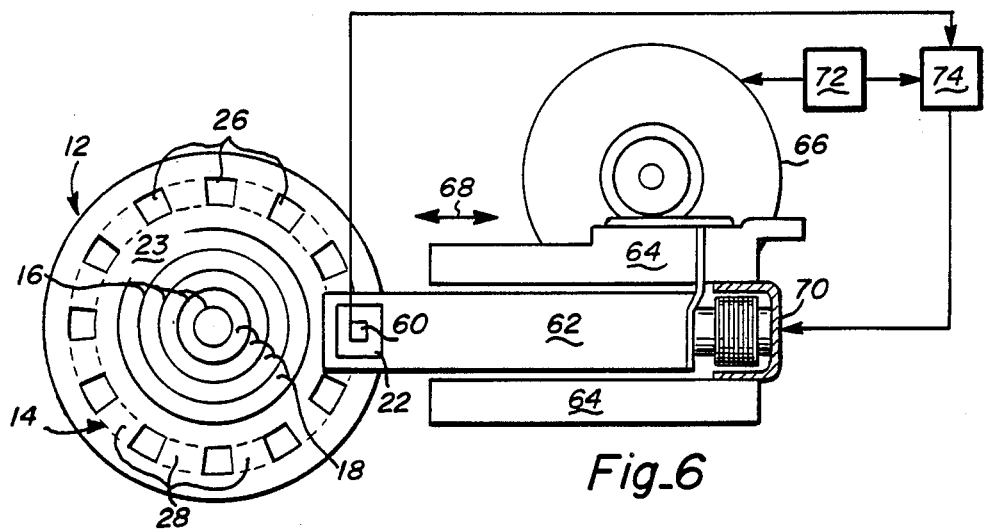
Fig_6
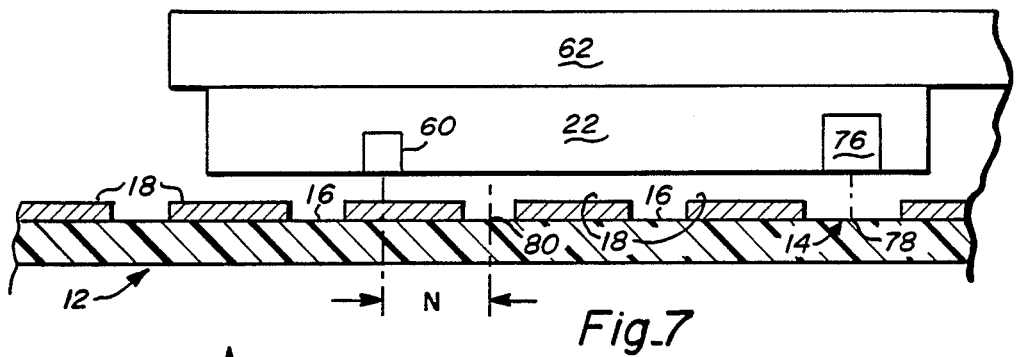
Fig_7
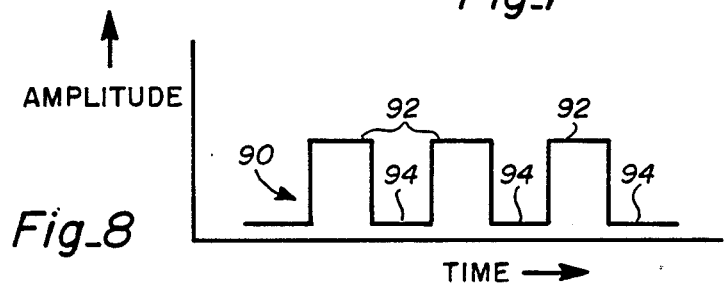
Fig_8
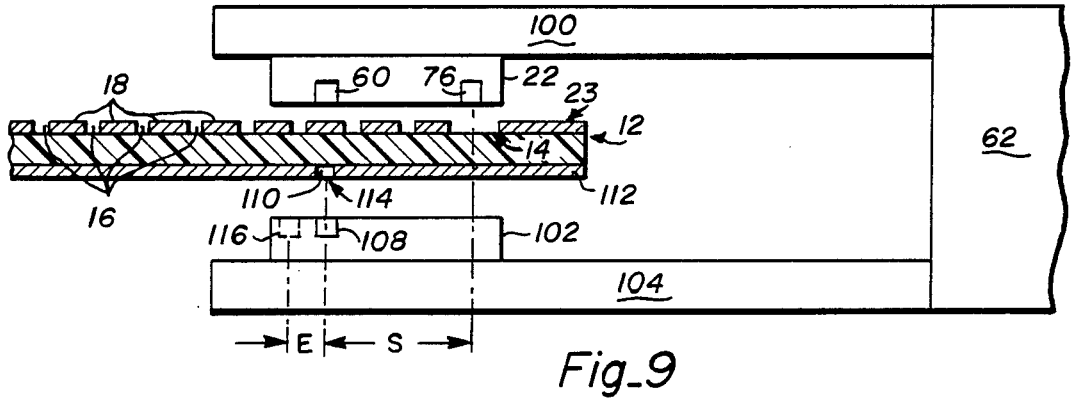
Fig_9

MAGNETIC MEDIA CONTAINING REFERENCE FEATURE AND METHODS FOR REFERENCING MAGNETIC HEAD POSITION TO THE REFERENCE FEATURE

BACKGROUND OF THE INVENTION

1. Field of the Invention

The present invention relates generally to a magnetic information storage medium and more particularly to such a medium having a reference feature marked on its surface for orienting a magnetic read/write head and for allowing track zero to be defined.

2. Description of the Prior Art

The track density of magnetic storage disks for conventional floppy disk drives is approximately forty-eight to one hundred thirty-five tracks per inch (TPI). In contrast, optical disk drives are capable of achieving track densities in excess of 15,000 TPI. These higher track densities are achieved through the use of closed loop optical servos that allow an optical read/write head to follow data track eccentricities caused by defects in the medium and by disturbances from outside forces. In rigid type magnetic disk drives, track densities of up to 1500 TPI are presently used. These drives commonly have multiple disks in which both sides are used for data. To achieve the high track density a dedicated surface of one of the disks is used for magnetic track servo information.

In order to utilize the multiple data tracks on flexible and rigid magnetic disk drives, a method for labeling the various data tracks is required. Typically, data storage disk drives have a location called track zero from which all other tracks are referenced. In conventional floppy disk drives, the track zero position is set by an adjustment of the stepper motor when the motor is locked at phase zero. Each data track is then a subsequent number of steps from the zero phase. Track zero is typically on the outer radius of the diskette. Since the stepper motor that positions the carriage is run in an open loop mode (no position feedback from the disk), the track zero position must be set very accurately from drive to drive. If not, the track zero location written on a disk by one drive might be in a different position than the track zero location on a disk written by a different drive. This could eliminate the interchangeability of media between disk drives.

Rigid media type disk drives (e.g. Winchester type drives) have track densities approximately ten times that of conventional floppy drives. A small error in detecting the position of track zero could result in a large offset of the read/write head to the data track. This is usually not a problem, however, since the media is formatted on the same drive that it is used in. Media is never removed from the drive so track zero position errors do not propagate.

Drives having multiple recording heads driven by a single positioning mechanism normally rely on a single reference device for determining track zero. Temperature, humidity and mechanical effects will cause both the media and head mechanisms to change their initial relationships with time and thus limit the maximum track density that can be achieved. If the media is removable the problem is compounded by the mechanical alignment tolerance from drive to drive.

In U.S. patent application Ser. No. 07/202,719, filed June 3, 1988, an apparatus and method are disclosed for inscribing physical features on a surface of a magnetic medium for providing optical servo tracking information.

At least two techniques have been reported for utilizing a mark inscribed in the metal oxide coating of a magnetic disk. Guglielmino, in U.S. Pat. No. 4,584,641, issued on Apr. 22, 1986, discloses a technique for preventing unauthorized copying of a program recorded on the magnetic disk in which a permanent mark is made on the magnetic disk, such as by scratching the metal oxide layer. Similarly, Brotby, in U.K. Patent Application No. 2,131,580 A, filed Nov. 1, 1983, discloses a technique for placing a permanent defective area on the surface of a magnetic disk for preventing unauthorized copying of a program recorded on the disk.

Various techniques have been reported for using optical means for acquiring track following servo information contained on a magnetic recording medium.

For example, Ahn, et al., in U.S. Pat. No. 4,633,451, issued on Dec. 30, 1986, for "Optical Servo For Magnetic Disks", discloses the use of a laser diode to read track following servo information in the form of a plurality of spots contained in an optical layer positioned above a magnetic recording layer.

DiStefano, et al., in U.S. Pat. No. 4,570,191, issued on Feb. 11, 1986, for "Optical Sensor For Servo Position Control", discloses a servo sensor comprising a light source and a light detector, axially aligned and contained on a single semiconductor chip.

M. Johnson, in U.S. Pat. No. 4,558,383, issued on Dec. 10, 1985, for "Information Storage Disk Transducer Position Control System Using a Prerecorded Servo Pattern Requiring No Alignment With The Storage Disk", discloses a servo apparatus having a sensor for detecting a pattern of spots on a surface of an information storage medium. The spots comprise a dense array of substantially translation invariant marks and separate information recording tracks are detected by measuring the rate at which the spots are detected.

J. Cocke, et al., in U.S. Pat. No. 4,587,579, issued on May 6, 1986, for "System for Position Detection On A Rotating Disk", disclose a servo control system comprising a detector for reading a plurality of spiral radial-position-encoding patterns on a medium.

A. S. Hoagland, in "Optical Servo Of Magnetic Recording", IBM Technical Disclosure Bulletin, Vol. 20(10), page 4108 (March 1978), suggests a system for achieving optical servo control where a flexible disk medium includes a plurality of optical servo tracks positioned underneath a magnetic layer.

D. A. Thompson, et al., in "Embossed Servo Techniques For Floppy Disks", IERE Conference Proceedings, No. 43, page 321 (July 1979), suggest the use of embossed marks on flexible magnetic media for obtaining non-magnetic optical or capacitive servo information.

N. Koshino and S. Ogawa, in "Optical Method Of The Head Positioning In Magnetic Disk Systems", preprint from *IEEE Transactions on Magnetics* (1980), discloses an optical head for achieving track following servo control which is mounted on the head arm and which includes an LED light source and three optical fibers for delivering light to a medium. The medium comprises a plurality of circular optical tracks, dyed black, and located underneath a magnetic film.

In U.S. patent application Ser. No. 07/178,542, filed Apr. 7, 1988, an optical servo tracking head is disclosed for reading optical servo tracking information contained on magnetic media comprising nonreflecting servo areas situated around reflective land areas.

Related work has occurred in the laser video disk area, from which optical disks for digital data storage and the audio laser disk (CD) have evolved. A laser and associated optics are used to acquire servo information as well as read data from the disk. The data can be inscribed during a mastering process as in video and audio disks or it can be written by the read/write laser as in disks for digital information storage.

K. D. Broadbent, in "A Review of the MCS Disco-Vision System", Journal of the SMPTE (1974), describes the Laser Video mastering techniques as well as the servo and read back methods. The mastering machine uses an argon laser to ablate pits in a metallic layer which is deposited on a glass plate. Disks are replicated from the master which contain servo information as well as the video data. A technique for deriving the servo information is described.

None of these techniques describe a method for utilizing the presence of a reference feature on the surface of a magnetic medium for directing a magnetic read/write head or an optical servo head to a position from which a plurality of data tracks can be referenced.

SUMMARY OF THE PRESENT INVENTION

It is therefore an object of the present invention to provide a magnetic disk configuration that permits simpler designation of track zero on disk drives that utilize a magnetic read/write head.

It is another object of the present invention to provide a magnetic disk configuration that increases the accuracy with which track zero is set.

It is another object of the present invention to provide a magnetic disk configuration that increases the reproducibility of track zero between disk drives.

It is another object of the present invention to provide a magnetic disk configuration that can be used to center the magnetic read/write head between optical or magnetic servo-tracking areas.

Briefly, the preferred embodiment of the present invention includes a circular magnetic medium, such as a floppy disk, having a physical reference track indelibly marked on one surface of the disk. When a magnetic read/write head passes over the reference track, the read back signal from the head changes. The pattern of the physical reference track is chosen so as to maximize the change in the read back signal. In the preferred embodiment, the physical reference track comprises a plurality of pits inscribed in the surface of the disk with a noninscribed land area positioned between each two adjacent pits. Higher amplitude data is recorded on the land areas than on the pits thereby producing the change in the read back signal. The pits are all located an equal distance from the center of the disk on a circle of radius $r_{ref}$. Typically, $r_{ref}$ is chosen so that the reference track is positioned along an outer circumference of the disk. This prevents interference of the magnetic head with an optical servo tracking head reading servo tracking information along an inner circumference. A plurality of equally spaced land areas are radially positioned between each pit. Many other patterns are possible for the reference track such as a continuous circular groove inscribed in the disk surface. Additionally, the reference track could be marked on the disk surface by various methods such as photolithography or chemical etching.

To designate track zero in a disk drive utilizing the reference track of the present invention, the read back signal from the magnetic head is observed as the magnetic head is scanned over the area around the reference track. When the read back signal indicates that the magnetic head is positioned over the center of the reference track a servo motor, which controls the positioning of the magnetic head, is locked into place over the reference track. The servo motor is then advanced a predetermined number of steps to a position that is defined as track zero.

In disk drives that utilize optical servo tracking features on the medium to execute the servo tracking function, the reference track can also be used to align the magnetic head between adjacent servo tracking features. For example, if the servo tracking features comprise a plurality of concentric rings inscribed in the surface of the magnetic medium, the magnetic head can be aligned between the concentric rings by determining the reference track center as described above. The offset between the servo track center and the reference track center is stored and used to adjust the servo position at each track location so that the magnetic head is centered between adjacent servo rings. In a disk drive that utilizes magnetic servo tracks, a similar procedure can be utilized to center the magnetic head between adjacent magnetic servo tracks.

An advantage of the present invention is that track zero can be located by direct reference to the reference track indelibly marked on the surface of the magnetic disk.

Another advantage of the present invention is that the absolute position of track zero is set by the reference track.

Another advantage of the present invention is that the accurate positioning of track zero permits magnetic media having the high track densities of rigid magnetic media to be interchanged among disk drives.

Another advantage of the present invention is that the reference track can be used to position the magnetic read/write head between adjacent optical or magnetic servo tracks.

Another advantage of the present invention is that the location of the reference track does not interfere with the reading of the servo tracking information.

These and other objects and advantages of the present invention will no doubt become obvious to those of ordinary skill in the art after having read the following detailed description of the preferred embodiments which are illustrated in the various drawing figures.

IN THE DRAWINGS

FIG. 1 is a top view of a circular magnetic medium including an indelible reference track according to the present invention;

FIG. 2 is a cross-sectional view of the magnetic medium taken along line 2—2 of FIG. 1;

FIG. 3 is a top view of an alternative embodiment of a magnetic medium according to the present invention;

FIG. 4 is a cross-sectional view of the magnetic medium taken along line 4—4 of FIG. 3;

FIG. 5 is a top view of another alternative embodiment of a magnetic medium according to the present invention;

FIG. 6 is a top view of an apparatus for positioning a magnetic read/write head over a magnetic disk;

FIG. 7 is a side view of the magnetic head and an optical head positioned over a disk containing a permanent reference track;

FIG. 8 is a graphical representation of a square wave signal received by the magnetic head as it passes over the indelible reference track of FIG. 1; and FIG. 9 is a side view of an upper magnetic head and a lower magnetic head positioned about a magnetic disk containing an indelible reference track and an electronic reference track.

DETAILED DESCRIPTION OF THE PREFERRED EMBODIMENT

FIG. 1 shows a permanently referenced magnetic disk represented by the general reference numeral 12 and comprising a permanent reference track 14, a plurality of servo-tracking (groove) areas 16, a plurality of data writing (land) areas 18 and an aperture 20. A conventional magnetic read/write head 22 is positioned over a surface 23 of the disk 12 for reading and/or writing magnetic data on the disk 12.

The reference track 14 is a circular region on the disk 12 having a constant radius $r_{ref}$ measured from the center of the aperture 20 to the center of the reference track 14, and which is positioned near an outer edge 24 of the disk 12. In the preferred embodiment the reference track 14 comprises a plurality of pits 26 which are depressed areas in the surface of the disk 12 having a length l. The pits 26 form a noncontinuous ring on the surface of the disk 12, noncontinuous meaning that each of the pits 26 are separated from each adjacent pit 26 by a spacer area 28. The spacer areas 28 yield higher signal level data than the pits 26.

The groove areas 16 can be of any configuration capable of conveying optical servo-tracking information to an optical servo head. In the preferred embodiment, each individual groove area 16 comprises a continuous ring of constant radius which circumscribes the hole 20. The radius for an individual groove area 16 differs from the radius of an adjacent groove area 16 by a constant amount. The land areas 18 are regions on the surface of the disk 12 capable of storing information that can be read by a magnetic transducer such as the read/write head 22. An individual land area 18 is bounded on two sides by adjacent groove areas 16 and the land areas 18 reflect more light than the groove areas 16.

FIG. 2 shows a cross section of the disk 12 and illustrates the relationship of the pits 26 and spacer areas 28 to the groove areas 16 and the land areas 18. The disk 12 comprises a medium 30 of the type used for conventional 3.5 inch floppy disks. The medium 30 comprises an inert layer 32 and a magnetic layer 34 coated on a surface of the inert layer 32. The pits 26 are rectangular shaped indentations cut through the magnetic layer 34 and generally do not extend into the inert layer 32. Each of the pits 26 have a depth d and width w. The groove areas 16 are also rectangular indentations cut through the magnetic layer 34 and each groove area 16 has a depth c and a width f. Each individual groove area 16 forms a continuous circular ring on the surface of the disk 12 having a radius $r_n$ measured from the center of the aperture 20 to the center of the groove area 16. Each of the groove areas 16 are equally spaced from each adjacent groove area 16. In the preferred embodiment, the radius $r_{ref}$ is greater than the largest $r_n$ and the reference track width w is larger than the groove width f. The reference track depth d is approximately equal to the groove depth c. The land areas 18 have a width g. A data track width x is defined as the width of a written data bit. Typically, the data track width x is less than the width g of the data writing areas 18. One of the data writing areas 18 is arbitrarily defined as a data track zero 36. The center of the data track zero 36 is separated from the center of the reference track 14 by a distance q. Representative dimensions for the reference tracks 26, groove areas 16 and land areas 18 are as follows:

w = 720 microinches (1 microinch = $1 \times 10^{-6}$ inches), d = 40–120 microinches, l = 0.075 inches, c = 20 to 40 microinches, f = 180 microinches, and g = 620 microinches. The aperture 20 comprises a centrally located hole extending perpendicularly through the disk 12.

FIG. 3 shows an alternative embodiment of the permanently referenced magnetic disk 12 represented by the general reference numeral 40. Elements of the disk 40 that are identical to elements of the disk 12 are designated by the same numeral followed by a prime symbol. In FIG. 3, a reference track 42 on the disk 40 replaces the reference track 14 of the disk 12 shown in FIG. 1. The reference track 42 comprises a continuous circular recessed area 44, having the radius $r_{ref}$, and a plurality of raised areas 46 positioned in the recessed area 44. The raised areas 46 are capable of storing a higher amplitude of magnetic data than the recessed area 44.

FIG. 4 shows a cross section of the disk 40. The raised areas 46 are of rectangular shape in cross section with a width j and depth k. The recessed areas 44 surround the raised areas 46 and have a width m and the depth k which is the same depth as that of the raised areas 46.

FIG. 5 shows another alternative embodiment of the permanently referenced magnetic disk 12 represented by the general reference numeral 50. Elements of the disk 50 that are identical to elements of the disk 12 are designated by the same numeral followed by a double prime symbol. In FIG. 5, a reference track 52 on the disk 50 replaces the reference track 14 of the disk 12 shown in FIG. 1. The reference track 52 comprises a continuous circular ring of radius $r_{ref}$ inscribed in the surface of the disk 12, and circumscribes the aperture 20''. The track 52 is very similar to the grooves 16'' but has a larger width p. It should be noted that while the reference tracks 14, 42 and 52 are preferably constructed by inscribing the surface of the disks 12, 40 and 50, respectively, they can be constructed by other techniques such as chemical etching, embossing, or photolithography.

FIG. 6 demonstrates an apparatus for positioning the magnetic head 22 over the disk 12. The magnetic head 22 and an optical servo tracking head 60 are positioned on a fine position actuator 62 over the disk 12. The fine position actuator 62 is mechanically connected to a base carriage 64 which is mechanically connected to a stepper motor 66 capable of moving the base carriage 64 in discrete steps in the forward or reverse directions indicated by an arrow 68 in FIG. 6. The fine position actuator 62 moves with the base carriage 64 and is also capable of moving independently of the base carriage 64 when driven by a voice coil motor 70. A control processor 72 is electrically connected to the stepper motor 66 and to a servo controller 74. The servo controller 74 is electrically connected to the voice coil motor 70 and to the servo head 60.

FIG. 7 shows the magnetic head 22 positioned over a part of the disk 12. A magnetic read/write element 76, which is the component of the head 22 that writes and/or reads magnetic data on the surface of the disk 12, is positioned over a reference track center area 78 located at the approximate center of the reference track 14. When the magnetic element 76 is positioned over the center area 78, the optical head 60 is offset from a servo track center area 80 for one of the servo tracking areas 16 by a magnetic-to-servo offset distance N.

FIG. 8 is a graphical representation of readback amplitude (A) versus time. A square wave type waveform 90 which approximates the form of the readback signal received by the read/write head 22 when the element 76 is centered over the reference track 14. The waveform 90 has a plurality of high amplitude parts 92 which indicate that data is being received by the element 76 and a plurality of baseline parts 94 which indicate that no data is being detected by the element 76. The magnitude of the high amplitude parts 92 is a function of the position of the element 76 relative to the center area 78.

FIG. 9 shows the magnetic head 22 positioned on an upper arm 100 and a lower magnetic read and/or write head 102 positioned on a lower arm 104. The arms 100 and 104 are mechanically connected to the fine position actuator 62. When the read/write element 76 is positioned over the reference track 14, a lower read/write element 108 on the lower head 102 is positioned over a region 110 of the magnetic disk 12. The region 110 is located on a lower magnetic surface 112 on an opposite side of the disk 12 from the surface 23. The centers of the read/write elements 108 and 76 are separated by a non-servo offset distance "S". An electronic reference track 114, comprising magnetic data written by the element 108, is written on the region 110. The electronic reference track 114 is marked by aligning the upper head 22 over the reference track 14. The lower element 108 is then instructed to write data whenever the upper head 22 is receiving the high amplitude part 92 of the square wave signal 90 and to write D.C. erasure whenever the upper head 22 is receiving the base line signal 94. Thus, when the lower element 108 reads the electronic reference track 114, the head 102 receives a square wave signal approximately identical to the square wave waveform 90 caused by the permanent reference track 14. Due to various environmental effects such as time, temperature, humidity, handling effects or manufacturing tolerances, the position of the element 108 can drift to a new position 116 offset from the original position of the element 108 by an error offset distance E. Thus, the offset distance E is the distance the element 108 drifts from the position of the element 108 originally noted when the element 76 was aligned over the center of the reference track 14.

Referring to FIG. 6, a technique for positioning the head 22 relative to the disk 12 can be explained. The stepper motor 66 is capable of moving the base carriage 64, and hence the fine position actuator 62, in approximately 83 discrete steps (detents) of approximately 7.4 mils per step. The voice coil motor 70 is capable of moving the fine position actuator 62, and hence the head 22, over a span of approximately ±20 mils from the center of a detent. Thus, by a combination of coarse and fine positioning, the head 22 can be positioned at any location on the surface 23.

The optical servo tracking head 60 reads optical servo information from the servo tracking areas 16 and sends it to the servo controller 74. The information from the optical head 60 is an error signal that indicates how far the head 60 is offset from a position equidistant between two adjacent groove areas 16. The servo controller 74 combines this signal with an offset signal from the control processor 72 and then drives the fine position actuator 62 until the net result is zero. The result is that the head 22 is locked at the offset specified by the control processor 72. Changing the head offset within a track, or moving the head 22 to a new track, is accomplished via the offset signal from the control processor. To illustrate this procedure, assume that the offset signal has 100 discrete values from 0 to 99 where the value 0 positions the servo head 60 over a first servo groove, 50 positions the servo head 60 equidistant between the first servo groove and a second servo groove, and 99 positions the servo head 60 just to the outside of the center of the second servo groove. Another way of envisioning this process is to consider the fine position actuator 62 as a device having 5100 discrete, lockable, positions numbered 0–5099 covering the 51 tracks within its positioning range (±25). The outermost track is covered by positions 0–99, the next by 100–199 and so forth. In this representation the control processor 72 increments/decrements low order two digits while the servo controller 74 increments/decrements the high order two digits.

To move the servo head 60 within the current track, the control processor 72 merely increments or decrements the offset signal to the desired value. To move the servo head 60 to a new track, the value is incremented or decremented until it overflows from 99 to 0 or underflows from 0 to 99, respectively. When either of these conditions occur, the servo controller accumulates the "carry" or "borrow" from the increment or decrement and moves the heads smoothly into the adjacent track.

Referring to FIG. 1, the procedure for using the head 22 to locate the reference track 14 can now be explained. As the magnetic read/write head 22, operating in the write mode, sweeps over the surface 23 of the disk 12, an arbitrary data pattern is written on the land areas 18 and on the spacer areas 28. In the preferred embodiment, the data pattern has a known frequency typically in the range of 533 kHz. As the head 22 scans the surface 23 in the read mode, it detects the signal from the data pattern until the reference track 14 is encountered. Because data can only be written on the spacer areas 28 of the reference track 14, the readback signal from the reference track 14 is modulated by the pits 26 to yield the square wave type waveform 90 shown in FIG. 8. The square wave waveform 90 is recognized as indicating that the reference track 14 has been located. The reference track center area 78 is determined by noting the position for the head 22 that yields the maximum value for the high amplitude part 92 of the waveform 90 in FIG. 8.

Typically, once the center area 78 has been determined, the data around the reference track is erased and a new data pattern is written which covers only the reference track 14. This procedure enhances the readback characteristics of the reference track 14. The electronic reference track 114 is written (formatted) at the same time the new data pattern is written on the reference track 14.

The procedure used to locate and format the reference track 14 and the electronic reference track 114 can be summarized as follows:

1. Use the stepper motor 66 to position the heads 22 and 102 at a location from which the reference track 14 can be accessed by the head 22 even under worst case mechanical tolerance conditions.

2. Write the surface 23 with high frequency data then read the surface 23 and analyze the data amplitude envelope. If the square-wave reference track modulation 90 is detected, go to Step 3. Otherwise, move the head 22 outward ¼ of the data track width x (see FIG. 2) and repeat this step.

3. Move the heads 22 and 102 inward ¼ of the head gap width.

4. Write the surface 23 with high frequency data then read the surface 23 and compute the average reference track modulation amplitude. Save this value in a table then move the heads outward 1/16 of the data track width x. Repeat this step 32 times.

5. Scan the data table generated by Step 4 to determine the peak modulation amplitude.

6. Scan the table again to determine the inner and outer head positions at which the modulation amplitude was ½ the peak value. The reference track center position 78 is the position equidistant from the two half amplitude positions.

7. Move the heads 22 and 102 and DC erase the surface 23 for 2½ tracks on either side of the reference track center. This procedure will enhance the readback characteristics of the formatted reference track.

8. Move the head 22 to the reference track center position 78, as determined in Step 6, and format the track 14 by writing it with high frequency data.

9. At the same head position, format the electronic reference track 114 with the head 102 by writing high frequency data interspersed with DC erasure so that the resulting reading data envelope resembles that of the indelible reference track 14.

The usefulness of the reference track 14 is that it is utilized in performing head alignment functions. For example, the reference track 14 simplifies the procedure used to locate the data track zero 36 shown in FIG. 2. The track zero 36 is the data track from which all other data tracks are referenced. In the simplified procedure of the present invention, the reference track 14 is applied to the disk 12, typically during a pre-use manufacturing stage. Next, when an end user is ready to format the disk 12, the center of the reference track 14 is located as described above. In disk drives that utilize magnetic or optical servo tracking procedures, once the center of reference track 14 is located, track zero is located by displacing the magnetic heads inward a fixed number of tracks, for example by means of a stepper motor or a voice coil motor. In the preferred embodiment, the distance q (shown in FIG. 2) is known. Therefore, to position the read/write element over the track zero 36, the head 22 is moved inward a number of positions corresponding to the distance q.

The reference track 14 is also utilized to determine the magnetic-to-servo offset distance N shown in FIG. 7. This is accomplished by electronically finding the reference track center area 78, centering the magnetic head over the center area 78 and noting the servo offset value at this position.

A similar procedure is utilized to determine the offset distance E shown in FIG. 9. The procedures for determining the magnetic-to-servo offset distance N and the offset distance E are summarized as follows:

1. Position the heads 22 and 102 to the innermost track at detent zero.

2. Read the surface 23 and analyze the data amplitude envelope. If the reference track modulation is detected, go to Step 3. Otherwise, move the heads outwards ½ of the data track width x and repeat this step.

3. Move the heads 22 and 102 inward ¼ of the gap width.

4. Read the surface 23 and compute the average reference track modulation amplitude. Save this value in a table then move the heads outward ⅛ of the head gap width. Repeat this step 16 times.

5. Scan the data table generated in Step 4 to determine the peak modulation amplitude.

6. Scan the table again to determine the inner and outer head positions at which the modulation amplitude was ½ the peak value. The reference track center 78 is the position equidistant from the two half amplitude positions.

7. Move the heads 22 and 120 until the head 22 is centered over the reference track 14. Note the servo offset value at this position and save it as the magnetic-to-servo alignment offset distance N for the surface 23.

8. Move the heads 22 and 102 inward four tracks (worst case servo-to-non-servo head offset).

9. Repeat Steps 2 through 6 for the lower magnetic surface 112.

10. Move the heads 22 and 102 until the lower head 102 is centered over the electronic reference track 114. Note the total offset at this position (servo and track offset) and save it as the non-servo offset distance E for the lower magnetic surface 112.

To illustrate the use of the offset values, assume the head positioning scheme described previously where each detent has 5100 discrete head positions. Also, assume the reference track center area 78 position is at 1523, the electronic reference track center position is at 1687 and a track zero offset of three tracks from the reference track center area 78 (+300 positions). The procedure described above would yield a magnetic to servo offset distance N of 23, an offset distance E of 187 and the track zero positions for the surfaces 23 and 112 would be 1823 and 1987 respectively.

To change from track zero on the surface 23 to the same track on the surface 112, the heads 22 and 102 are moved $187-23=164$ positions inwards. To change from this position to track one on the surface 23, the heads 22 and 102 are moved $100+(23-187)=-64$ or 64 positions outwards.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. An information storage medium comprising:
a rotatable circular magnetic medium having a first surface that is accessible by a first magnetic read/write transducer and by an optical servo transducer;
a plurality of optical servo tracks positioned on said first surface for providing servo positioning information to said optical servo transducer; and
a circular reference feature track positioned on said first surface for providing said magnetic read/write transducer a positional reference track region relative to said optical servo tracks and comprising a plurality of radially positioned depressions in said first surface for generating a readback signal having a variable amplitude pattern when said first magnetic read/write transducer is reading magnetic data recorded on the reference feature track.

2. The information storage medium of claim 1 wherein,
the magnetic medium is a floppy disk comprising a magnetic layer coated on a flexible inert substrate; and
the optical servo tracks comprise a plurality of concentric rings inscribed in said magnetic layer with adjacent rings being separated from each other by a land area on which data is written and which has a higher reflectivity than said concentric rings.

3. The information storage medium of claim 2 wherein,
the reference feature track comprises a plurality of pits inscribed in said magnetic layer and positioned along said circular track on said first surface, and a plurality of spacer areas positioned between adjacent pits.

4. The information storage medium of claim 3 wherein,
a higher amplitude read back signal is detected by said first magnetic read/write transducer from said spacer areas than from said pits.

5. The information storage medium of claim 2 wherein,
the reference feature track comprises a recessed circular track inscribed in said magnetic layer; and
a plurality of equally spaced arcuate areas positioned in the approximate center of said recessed circular track for yielding a higher amplitude data signal than is yielded by said recessed circular track.

6. The information storage medium of claim 1 wherein,
the reference feature track is inscribed in the surface of the magnetic medium.

7. The information storage medium of claim 1 wherein,
the reference feature track is embossed on the surface of the magnetic medium.

8. The information storage medium of claim 1 wherein,
the optical servo optical tracks comprise a plurality of concentric rings inscribed in said first surface with each of said concentric rings being spaced from an adjacent concentric ring by a constant distance.

9. The information storage medium of claim 8 wherein,
said constant distance is less than approximately nine hundred microinches.

10. The information storage medium in claim 8 further comprising,
a plurality of land areas on which data can be recorded with one of the land areas being positioned between each of said adjacent concentric rings.

11. The information storage medium of claim 10 wherein,
said positional reference region provides positional information from which one of said land areas is referenced as a track zero data track.

12. The information storage medium of claim 1 further comprising,
a second surface that is accessible by a second magnetic read/write transducer; and
an electronic reference track magnetically recorded on the second surface by said second magnetic read/write transducer for providing positional information about said second magnetic read/write transducer relative to said first magnetic read/write transducer.

13. The information storage medium of claim 12 wherein,
the electronic reference track is written on said second surface in response to an electrical signal related to said readback signal generated by said first magnetic read/write transducer.

14. The information storage medium of claim 12 wherein,
the electronic reference track provides positional information from which a track zero data track on said second surface is referenced.

15. The information storage medium of claim 12 wherein,
the electronic reference track provides positional information for aligning said second magnetic read/write transducer relative to the plurality of optical servo tracks located on said first surface.

16. An information storage medium comprising,
a flexible magnetic disk having a surface that is accessible by a magnetic read/write transducer and an optical servo transducer;
a plurality of optical servo tracks positioned on said surface and comprising a plurality of concentric rings inscribed in said surface for providing servo tracking information to said optical servo transducer with adjacent concentric rings separated from each other by less than nine hundred micro inches; and
a permanent reference feature indelibly marked on said surface comprising a plurality of inscribed areas positioned radially along a circle on said surface, which yield a lower amplitude readback signal when magnetic data recorded on said inscribed areas is read by said magnetic data read/write transducer, and a plurality of noninscribed areas interspersed between said inscribed areas, which yield a higher amplitude readback signal when magnetic data recorded on said noninscribed areas is read by said magnetic read/write transducer, for providing said magnetic read/write transducer a positional reference area relative to the optical servo tracks.

17. A method for determining the magnetic-to-servo offset for a magnetic read/write transducer and an optical servo transducer that comprises:
a. inserting a magnetic disk into a disk drive system, the magnetic disk having a plurality of optical servo tracks marked on a surface of the magnetic disk and comprising a plurality of equally spaced concentric rings, and a permanent reference feature positioned on said surface that yields a recognizable readback signal when magnetic information recorded on said permanent reference feature is read by a magnetic transducer;
b. magnetically writing information on said surface and on said permanent reference feature with said magnetic transducer;
c. determining a location of said permanent reference feature by sweeping said magnetic transducer over said surface until said recognizable readback signal is detected;
d. positioning said magnetic transducer relative to said reference feature; and
e. noting an offset value for said optical servo transducer that indicates a distance said optical servo transducer is offset from a servo track.

18. The method of claim 17 further comprising the steps of,
   a. recording the position of said reference feature after its location is determined;
   b. erasing said magnetic information; and
   c. rewriting magnetic information at the position of said reference feature.

19. A method for writing an electronic reference track on a magnetic disk comprising:
   a. positioning a first magnetic read/write transducer over a permanent reference feature marked on a first surface of a magnetic disk for providing said magnetic read/write transducer a positional reference region relative to a plurality of optical servo tracks positioned on said surface, and comprising a plurality of depressions in said first surface for generating a readback signal having a variable amplitude when said first magnetic read/write transducer is reading magnetic data recorded on the reference feature; and
   b. causing a second magnetic read/write transducer to write an electronic reference track on a second surface of said magnetic disk in response to signals generated by the first magnetic read/write transducer.

20. A method for determining the drift in position of a magnetic read/write transducer comprising the steps of:
   a. positioning a first magnetic read/write transducer over a permanent reference feature marked on a first surface of a magnetic disk for providing said magnetic read/write transducer a positional reference region relative to a plurality of optical servo tracks positioned on said surface, and comprising a plurality of depressions in said first surface for generating a readback signal having a variable amplitude when said first magnetic read/write transducer is reading magnetic data recorded on the reference feature;
   b. moving a second magnetic read/write transducer until it is positioned over an electronic reference feature marked on a second surface of said disk; and
   c. noting the offset required to position the second magnetic read/write transducer over said electronic reference feature.

21. An information storage medium comprising:
   a flexible rotatable circular magnetic disk medium having a first surface that is accessible by a first magnetic read/write transducer and by an optical servo transducer;
   a plurality of optical servo tracks positioned on said first surface for providing servo positioning information to said optical servo transducer; and
   a circular reference feature track positioned on said first surface and adjacent to the outer perimeter of the medium for providing said magnetic read/write transducer a positional reference track region relative to said optical servo tracks, the reference feature track comprising a pattern of a plurality of radially positioned depressions in said first surface and a plurality of land areas with said land areas being intermediate said depressions for generating a readback signal having a variable amplitude when said first magnetic read/write transducer is reading magnetic data recorded on the reference feature track, and said depressions each being located an equal distance from the center of the disk.

* * * * *